Patented Feb. 23, 1954

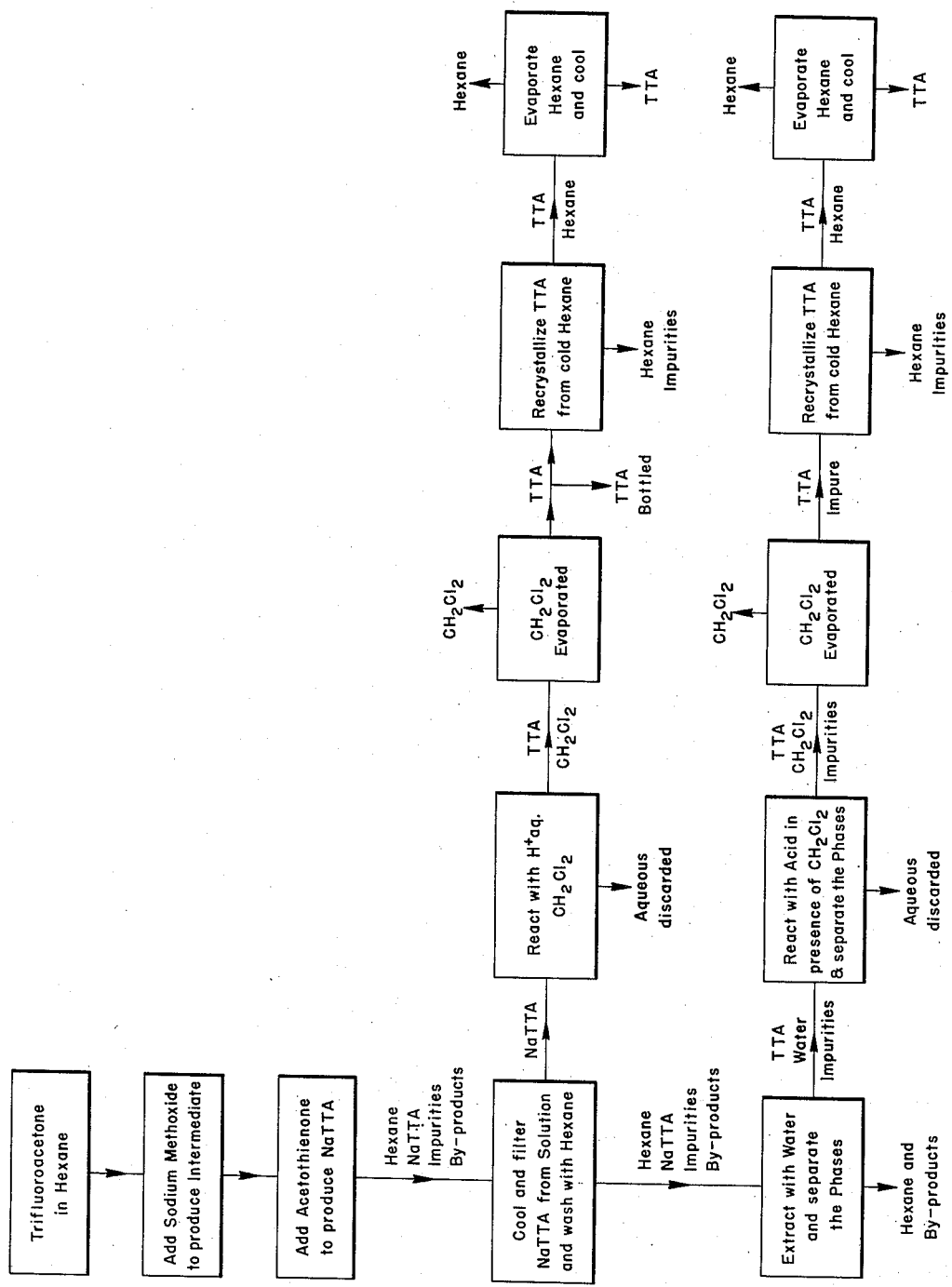

2,670,353

UNITED STATES PATENT OFFICE 2,670,353

PROCESS FOR THE PRODUCTION OF
FLUORINATED DIKETONES

Milton W. Davis, Jr., Wilmington, Del., assignor to the United States of America as represented by the United States Atomic Energy Commission Application October 28, 1948, Serial No. 57,006

11 Claims. (Cl. 260—332.3)

1

This invention relates to processes for the production of fluorinated diketones and, more particularly, to improvements in processes for the production of fluorinated B-diketones by means of the Claisen condensation reaction.

The Claisen condensation is a widely-known reaction which has been utilized for many years in various organic syntheses involving aldehydes, ketones, and esters. Modifications of the Claisen reaction have also been used in processes for the production of B-diketones.

Older processes which employ the Claisen reaction are difficult to operate due to the complexity of the operations involved, the nature and character of the intermediate and final products, and the nature of the extraneous materials from which the products must be separated. These older processes are suitable for laboratory preparations since time and expense are rarely of consequence in these circumstances, but such processes are not suitable for practical commercial operation where time and expense are factors of major importance.

There has existed an acutely felt need for processes which are better adapted to large scale manufacture of the fluorinated B-diketones. These compounds offer great commercial potentialities, and they should find immediate and hearty acceptance by industry when they are made available at reasonable cost and in large quantities.

Now, applicant has found that many of the difficulties of the previous processes may be avoided or overcome by employing reaction media having certain properties. By employing these media, a precursor of the final product is obtained in a form which is easily separated from extraneous material contained in the reaction mixture, thereby eliminating the necessity of later complex purification steps.

Furthermore, applicant has found that the final product may be obtained in excellent yield and high purity by releasing the final product from the precursor under certain conditions, and in the presence of a second phase of a selected class of extraction media.

Applicant's process provides, also for the substantially complete recovery of the product from the various reaction mixtures, filtrates, and the like which are obtained in the various stages of the process.

Accordingly, it is an object of this invention to provide favorable reaction media in which Claisen condensations may be conducted.

A prime object of this invention is to provide processes suitable for the commercial production of fluorinated diketones.

It is another object of this invention to provide an improved process for the production of fluorinated B-diketones.

It is another object of this invention to provide a method of conducting a Claisen condensation reaction for producing B-diketones in which a precursor of the final product is produced in a form which may be easily separated from extraneous material.

It is also an object of this invention to provide for the release of the final product under optimum conditions.

It is a further object of this invention to release the final product from the precursor by treating the precursor in an acidic aqueous phase which is in contact with a second phase of selected extraction solvent.

It is a still further object of this invention to provide methods for substantially complete recovery of the product.

Another object of this invention is to provide favorable conditions for carrying out the operations of the process.

The invention, both as to its organization and method of operation, together with further objects and advantages thereof, will best be understood by reference to the following specification taken in connection with the accompanying drawing in which the single figure illustrates a flow diagram of a process in conformity with the invention.

In accordance with the present invention, sodium alkylate is reacted with a fluoroacetate ester in a favorable medium. When this first reaction is complete, a ketone is added to the reaction mixture, thereby initiating a second reaction which is allowed to proceed to completion to produce the precursor of the final product.

Applicant has found that when these reactions are conducted in media of a selected class and with suitable conditions, the precursory compound is precipitated in a form which is easily removed from reactors and which is easily separated from extraneous material contained in the reaction mixture. This circumstance eliminates complicated purification steps in the later stages of the process. This result is believed to be due to the fact that the precursor is substantially insoluble in the selected reaction medium while the troublesome impurities are soluble therein, and the selected reaction medium promotes the formation of physical forms which have desirable processing characteristics.

Aliphatic hydrocarbon solvents appear to possess the desired properties in a high degree, while the naphthenic types possess these properties to a lesser extent. It is possible that mixtures of these solvents or mixtures of other types of solvents with these materials may also be satisfactory. In order to facilitate removal of the solvent from solid materials, it appears that the medium and lower boiling materials of these groups are most suitable.

Ethyl fluoroacetate esters have proven to be entirely satisfactory for the purposes of this invention, and the particular ester, ethyl trifluoroacetate, is considered to be a preferred material for the production of the trifluoroderivatives although esters of other alcohols are satisfactory substitutes.

Sodium methoxide is a most favorable reagent of the alkylate class for the purposes for which it is employed in this process. Other alkali metal alkylates are also suitable and may be likewise employed. The alkylates of the higher alcohols are less desirable in that contamination due to the presence of these materials is more troublesome due to unfavorable solubility characteristics which they possess.

The precursory compound is separated from the reaction mixture by filtering and washing with fresh portions of the reaction medium or with other suitable solvent.

The final product is released from the precursor by reaction with hydrogen ion which reaction is conducted in an aqueous phase in contact with a separate phase of selected solvent into which the product is extracted. The product which is extracted by the second phase is recovered therefrom by evaporating the solvent from the material.

Halogenated hydrocarbons have been found to be very satisfactory extraction agents for the latter purpose. The requirements for a solvent suitable for this use are that the final product must be very soluble in it; that it is not miscible to any substantial degree with the aqueous phase, and that the boiling point of the material is low enough to facilitate easy removal of the solvent from the solid materials by evaporation. Of the halogenated hydrocarbons, it has been found that the particular material, methylene chloride ($CH_2Cl_2$), possesses the desired properties.

Mineral acid reagents have been found most suitable to supply the hydrogen ion required in this last reaction. Of the mineral acids, hydrochloric, sulfuric, hydrosulfuric, and phosphoric possess the requisite properties. It is undesirable that the acid have a high solubility in the solvent with which it is in contact, and acids such as nitric acid which possess oxidizing properties may prove to be unsatisfactory.

The residual precursory compound remaining in the reaction medium is recovered by an aqueous extraction of the reaction medium followed by an acidification of the aqueous extract, the product being recovered therefrom by extraction with a selected solvent. The extracted material is then purified by evaporating the solvent and recrystallizing the impure product from the selected reaction medium.

It is contemplated that the present invention may find suitable employment in the production of fluorinated β-diketones and more particularly in the production of the class of diketones which may be represented by the formula $RCO-CH(R')-COCF_3$ where R and R' may be aliphatic, aromatic, or heterocyclic substituents and where R' may also be hydrogen.

It has been found that the present process is particularly suited to the manufacture of thenoyltrifluoroacetone, and the examples and descriptions given below will be with respect to the production of this compound. No limitation of the applicability of the present invention to the production of this compound is to be inferred or implied therefrom.

Considering now the details of a process for the production of thenoyltrifluoroacetone (hereinafter abbreviated TTA) in accordance with the present invention, reference is made to the accompanying flow diagram.

A suitable reaction vessel for carrying out the operations of the present invention comprises a closed, enamel-lined, metal vessel which is equipped with a refluxing condenser arrangement and mechanical stirring means. The reaction vessel should be equipped with means to maintain an atmosphere of nitrogen or other inert gas over the reaction mixtures at all times and also should be equipped with adequate temperature controlling means.

Quantities of hexane and ethyltrifluoroacetate are introduced into the vessel. Subsequently, an appropriate quantity of sodium methoxide is added, preferably, with adequate cooling and vigorous stirring. The reaction is allowed to proceed to completion, which generally requires about twenty minutes when the reaction temperature is about 40° C. The above order of addition is preferred, since no caking of the reaction mixture results when this order of addition is employed, whereas serious caking of the reactant results if the reverse order is employed.

Upon the completion of the reaction of the ethyltrifluoroacetate and sodium methoxide, an appropriate quantity of acetothienone is added slowly to the reaction mixture with constant, vigorous stirring whereby a fine dispersion of acetothienone is produced and maintained in the reaction medium. At room temperature, this reaction requires about twenty hours to reach equilibrium or substantial completion. The product of this reaction is a sodium derivative of TTA (hereinafter abbreviated as NaTTA). NaTTA is precipitated from and forms a slushy mixture with the reaction medium. This NaTTA is the precursor from which TTA is later recovered. To further the precipitation, the reaction mixture may be cooled and the slushy mixture may then be removed from the reaction vessel.

The slushy mixture of NaTTA is separated from the reaction mixture by filtering and by washing with hexane. Filtrates, including the wash portions, are retained in order that they may be processed to recover the residual NaTTA which they contain as will be described below. Occluded hexane is removed from the filtered material by evaporation. Substantially all of the impurities remain in the hexane when it is chilled to precipitate the NaTTA, and the hexane is easily removed from the NaTTA.

The precursory compound (NaTTA) is reacted in the cold with aqueous acid in the presence of a separate phase of $CH_2Cl_2$. Applicant has found it most advantageous to conduct the acidic reaction at temperatures approaching 0° C. and in such a manner that the hydrogen ion concentration is not permitted to remain in the critical pH 7–9 range where hydrolysis is most rapid.

By employing these conditions during the acidic reaction, applicant minimizes losses from hydrolytic side reactions.

The TTA is extracted from the aqueous phase during the acidic reaction by the CH$_2$Cl$_2$ phase. The extract is then washed with water to remove NaCl and HCl which are also extracted to a certain extent, and the CH$_2$Cl$_2$ is evaporated from the TTA by heating. The TTA may then be bottled or if an objectionable amount of decomposition has taken place, it may be purified by recrystallization from hexane in the cold.

The reaction mixture filtrate from above contains a mixture of compounds including NaTTA, unreacted acetothienone and fluoroester, ethyl and methyl alcohols which were produced by the reaction, and a red side-reaction product. The NaTTA remaining in the reaction mixture may be recovered by the following procedure. The reaction mixture is extracted with water and the water phase is rapidly acidified to pH 1 in the cold, and in the presence of a phase of CH$_2$Cl$_2$ into which the TTA is extracted.

The TTA is recovered by evaporating the CH$_2$Cl$_2$ from the TTA, and the impure TTA residue is purified by dissolving it in warm hexane and precipitating it by cooling the hexane solution. The product obtained after a single recrystallization is generally sufficiently purified for most purposes and, of course, the purity may be increased by repeating the recrystallization.

The following is a description of semi-scale plant operation in which TTA has been manufactured by a process in conformity with applicant's invention.

The reaction vessel which was employed for carrying out the operations of this process was an enamel-lined, closed, mechanically-stirred, thermally-jacketed kettle of standard commercial design (Pfaudler). The kettle was fitted with a reflux condenser arrangement in order to retain volatile components in the vessel, and the vessel was arranged and adapted to maintain a nitrogen atmosphere over the reactants at all times.

Six liters (96 g. moles) of hexane and 11.4 liters (96 g. moles) of ethyl trifluoroacetate were introduced into the kettle. Next, 5.5 kilos. of sodium methoxide (95%) were added very slowly, with a maximum amount of cooling, and with vigorous stirring. This reaction required about twenty minutes from the time the sodium methoxide was added to attain completion, with a reaction temperature of about 40° C.

Next, 10.4 liters (96 g. moles) of acetothienone was added very slowly and with vigorous stirring to produce and maintain a fine dispersion of acetothienone in the reaction mixture, and this mixture was allowed to react for about twenty hours at room temperature.

At the conclusion of the reaction period, the NaTTA produced by the reaction had been precipitated to form a slushy mixture. The slushy mixture was of a red color due to the formation of a red impurity by a side-reaction.

The precipitated NaTTA was separated from the liquid by filtering on a vacuum filter and by washing with hexane while on the filter whereby all of the red impurity was removed from the NaTTA. Residual hexane was removed from the NaTTA by drawing air through the mass of NaTTA on the filter. The hexane filtrates were stored to be treated for the recovery of NaTTA as described below.

The solvent-free NaTTA was treated to release and recover the TTA in the following manner. Hydrochloric acid equivalent to 13 liters of 6 N acid which was prepared by mixing cracked ice and concentrated hydrochloric acid was introduced into the kettle. Then 5 liters of CH$_2$Cl$_2$ were poured into the kettle to form a solvent phase. The NaTTA in finely powdered form was added slowly with vigorous stirring whereupon TTA was formed and was extracted into the CH$_2$Cl$_2$ phase. During this operation, the temperature was maintained as near to 0° C. in order to reduce side reactions.

When the acidification was complete, the CH$_2$Cl$_2$ phase was separated from the aqueous phase and the aqueous phase was reextracted with a second portion of CH$_2$Cl$_2$ amounting to one-seventh the volume aqueous phase and the two extracted portions were combined. The aqueous phase was discarded. The CH$_2$Cl$_2$ extract was washed once with one-seventh its own volume of water to remove dissolved NaCl and HCl, the CH$_2$Cl$_2$ was then evaporated from the TTA by heating to 100° C. in a stripping still, and then the TTA was withdrawn into brown bottles.

The hexane filtrate from above was treated in the following manner to recover contained TTA. The hexane solution was twice extracted with water in the amount of one-twentieth of its own volume, and the two extracts were combined. This water extract which also contained the red impurity was rapidly acidified at 0° C. to pH 1 in the presence of about one-fifteenth volume of CH$_2$Cl$_2$, whereupon the TTA and the red impurity were extracted into the solvent phase. The solvent phase was separated from the aqueous, washed with water, and the solvent was evaporated from the TTA. The TTA obtained from this treatment was red due to the presence of the impurity. The impurity was removed by melting the TTA, dissolving in warm hexane, and crystallizing from the hexane by cooling.

The method of recrystallization was as follows: The TTA containing impurities, including the red material mentioned above, was melted and mixed with one-third its volume of hexane and was allowed to cool. The TTA crystallized in a characteristic slushy form and was separated from the solution, which now contained the impurities, by filtering and washing with hexane. Dry Ice was used to cool the filtrates to precipitate more of the TTA, which process was repeated after the solution was concentrated by evaporation. The product obtained from recrystallization was a clear white color and assayed 99%+ in TTA.

While it may be considered that the embodiments as disclosed are of a preferred nature, various changes may be made without departing from the invention, and it is intended to cover all such that come within the true scope and spirit of the appended claims.

What is claimed is:

1. In a process for producing TTA, the steps comprising reacting sodium methoxide and ethyl trifluoroacetate in an aliphatic hydrocarbon solvent; reacting acetothienone with said reacted compounds to produce NaTTA in the form of a finely divided precipitate; separating said precipitate by filtering and washing with fresh portions of said solvent; removing said solvent from said NaTTA; treating said NaTTA with aqueous hydrochloric acid in contact with a phase comprising halogenated hydrocarbons having a boiling point less than 80° C. whereby TTA is formed and extracted into said halogenated hydrocarbon phase; recovering TTA from said halogenated hydrocarbon phase; treating said filtrates from said reaction with an aqueous phase to extract residual NaTTA; acidifying said aqueous phase extract while in contact with a phase comprising said halogenated hydrocarbons to release TTA into said phase; recovering TTA from said phase; and purifying said TTA by dissolving in a portion of said aliphatic hydrocarbon and crystallizing TTA therefrom.

2. In a process for the production of TTA, the steps comprising reacting sodium methoxide and ethyl trifluoroacetate in hexane and in the cold; reacting acetothienone with said reacted compounds at about room temperature to form NaTTA in a precipitated form; separating said NaTTA from the reaction mixture; then reacting the NaTTA with cold aqueous hydrochloric acid in contact with a phase comprising $CH_2Cl_2$ whereby TTA is formed and extracted into said $CH_2Cl_2$ phase; and recovering TTA from said $CH_2Cl_2$ phase.

3. In a process for the production of TTA, the steps comprising reacting sodium methoxide with ethyl trifluoroacetate dissolved in an aliphatic hydrocarbon; reacting acetothienone with said reacted compounds to form NaTTA in a precipitated form; separating said precipitated NaTTA from the reaction mixture; reacting NaTTA in acidic aqueous phase in contact with solvent phase to release TTA into said solvent phase; and recovering TTA from said solvent phase.

4. In a process for the production of TTA, the steps comprising (1) reacting sodium methoxide with ethyl trifluoroacetate in hexane solution, (2) adding acetothienone to the reaction mixture derived from step 1 to produce NaTTA in a precipitated form, (3) separating NaTTA from the reaction mixture derived from step 2, (4) reacting the NaTTA derived from step 3 with aqueous hydrochloric acid in contact with methylene chloride whereby TTA is produced and enters the methylene chloride, (5) separating the methylene chloride phase derived from step 4 from the aqueous phase, (6) separating TTA from the methylene chloride phase derived from step 5.

5. The process of producing TTA comprising reacting sodium methoxide with ethyl trifluoroacetone in an aliphatic hydrocarbon solvent to yield an intermediate compound, reacting acetothienone with said intermediate compound to yield NaTTA substantially as a precipitate in said aliphatic hydrocarbon solvent, separating said NaTTA from the reaction mixture, reacting said NaTTA with aqueous phase mineral acid in contact with a solvent phase comprising a halogenated hydrocarbon having a boiling point of less than 80° C. whereby TTA is formed and enters said solvent phase, separating said solvent phase containing TTA from said aqueous phase, and separating TTA from said solvent phase.

6. The method of producing NaTTA comprising reacting sodium methoxide and ethyl trifluoroacetate in hexane in the proportion of 1:1:1, reacting one molar proportion of acetothienone with the reacted materials in said hexane to produce NaTTA in a precipitated form, and separating said TTA from the reaction mixture.

7. The method of purifying TTA comprising melting said TTA, mixing said melted TTA with warm hexane, cooling the mixture to crystallize TTA therefrom with said impurities remaining dissolved in the hexane, and separating the crystallized TTA from the mixture.

8. The method of purifying TTA comprising melting said TTA, mixing said melted TTA with about one-third of its own volume of aliphatic hydrocarbon, cooling said mixture to crystallize TTA therefrom leaving impurities dissolved in said aliphatic hydrocarbon, filtering said TTA from the mixture while in the cold, and washing said filtered TTA with fresh portions of said aliphatic hydrocarbon while in the cold.

9. The process as in claim 1, wherein said aliphatic hydrocarbon solvent comprises hexane and said halogenated hydrocarbon phase comprises methylene chloride.

10. The process as in claim 1, wherein said step of treating NaTTA with aqueous hydrochloric acid is conducted at a temperature approaching 0° C. and the pH of the aqueous phase is maintained substantially outside the range pH 7–9.

11. In a process for the production of thenoyltrifluoroacetone, the steps of reacting an alkali metal methoxide with ethyl trifluoroacetate in the presence of a liquid paraffinic hydrocarbon as a reaction medium, adding acetothienone to the resulting mixture and reacting the acetothienone with the product of the first reaction, whereby an alkali metal salt of thenoyltrifluoroacetone is formed and precipitates from the reaction mixture.

MILTON W. DAVIS, Jr.

References Cited in the file of this patent

Reid et al.: U. S. A. E. C., Oak Ridge, Tenn., MDDC–1405 (BC–75) of August 13, 1947; declassified October 24, 1947.